Inventor
FRANZ J. HERBSTHOFER
BY
Gerhardt, Greenlee & Farris
Attorneys

Oct. 5, 1971  F. J. HERBSTHOFER  3,609,947
COMBINE GROUND SPEED AND DRUM SPEED AUTOMATIC CONTROL
Filed Oct. 7, 1969  2 Sheets-Sheet 2

Inventor
FRANZ J. HERBSTHOFER
BY
Gerhardt, Greenlee & Farris
Attorneys

United States Patent Office 3,609,947
Patented Oct. 5, 1971

---

3,609,947
COMBINE GROUND SPEED AND DRUM SPEED AUTOMATIC CONTROL
Franz Joseph Herbsthofer, Kassel-Herleshausen, Germany, assignor to Massey-Ferguson G.m.b.H., Staendeplatz, Germany
Filed Oct. 7, 1969, Ser. No. 864,474
Claims priority, application Great Britain, Oct. 11, 1968, 48,206/68
Int. Cl. A01d 41/02
U.S. Cl. 56—10.2
2 Claims

ABSTRACT OF THE DISCLOSURE

A combine harvester thresher with driven ground wheels, a crop-treating assembly, an engine to drive the ground wheels and the crop-treating assembly, and crop gathering means which includes an elevator assembly in an elevator housing for conveying crop material to the crop-treating assembly. The drive for the driven ground whels includes a variable V-belt drive. The crop-treating assembly is driven by belt drives from the engine. When an excessive amount of crop material enters the elevator housing, the elevator assembly is deflected upwardly causing the electrical contacts of a sensor to make contact. This causes current to pass through a circuit and to energize a pair of solenoids. One of the solenoids reduces the ground speed of the machine by actuating the control for the variable V-belt drive. The other solenoid switches the two-stage governor on the engine from one stage to another to run the crop-treating assembly at a faster speed.

---

This invention relates to mobile agricultural crop-collecting and crop-treating machines and especially but not exclusively to a combine harvester thresher.

The amount of crop material which is fed per unit of time into a combine harvester driven at constant ground speed can be irregular because the density of the growing crop is irregular or because the feeding devices convey irregularly when combining crop which has been laid by wind and rain. The result is that overloading of the threshing cylinder, the straw walkers and the shaker shoe cannot be avoided. Overloading the threshing cylinder can bring about damage of the threshing elements and/or the feared wrapping of crop material around the cylinder, whereby the threshing cylinder often comes to a standstill and must be unplugged. Furthermore, overloading the threshing cylinder, the straw walkers and the shaker shoe results in higher losses of grain.

According to the present invention, there is provided a mobile agricultural crop-collecting and crop-treating machine comprising a crop-treating assembly and first means for driving same, a ground-drive and second means for driving same, a sensor adapted and arranged to signal in response to a variation in crop intake rate, and control means operative in response to a signal received from the sensor oppositely to vary the speeds of the first and second driving means. The first driving means comprises a variable speed engine or motor and a fixed ratio transmission between the engine and the crop-treating assembly. The second driving means comprises a variable-ratio transmission between the said engine and the ground-drive. The control means comprises a ratio-adjuster associated with the variable ratio transmission, a speed governor associated with the engine or motor, and means operatively connected to the ratio-adjuster and the speed governor and responsive to a signal received from the sensor. The speed-governor is a two-stage governor switchable from one stage to the other by a signal received from the sensor. Solenoid actuators are associated with the ratio-adjuster and the speed-governor to receive the signal from the sensor and make adjustments in the engine speed and the ground speed.

Figure 1:
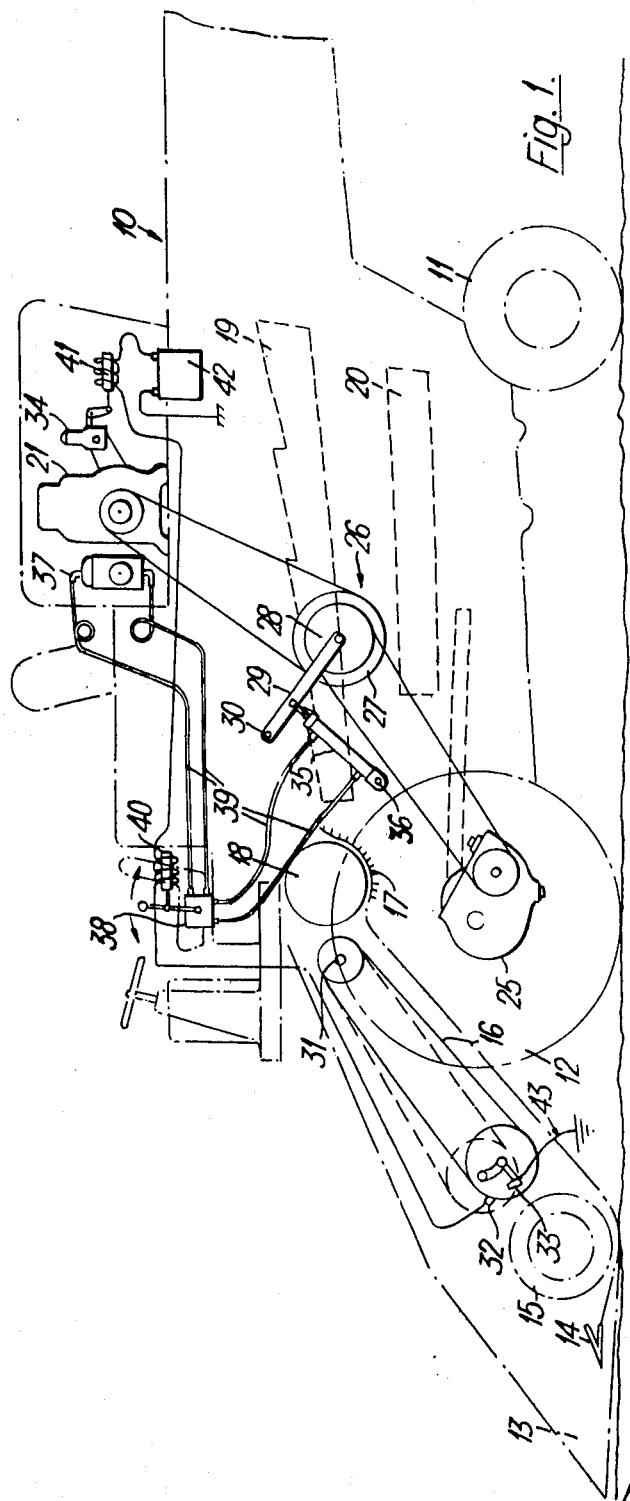
Figure 2:
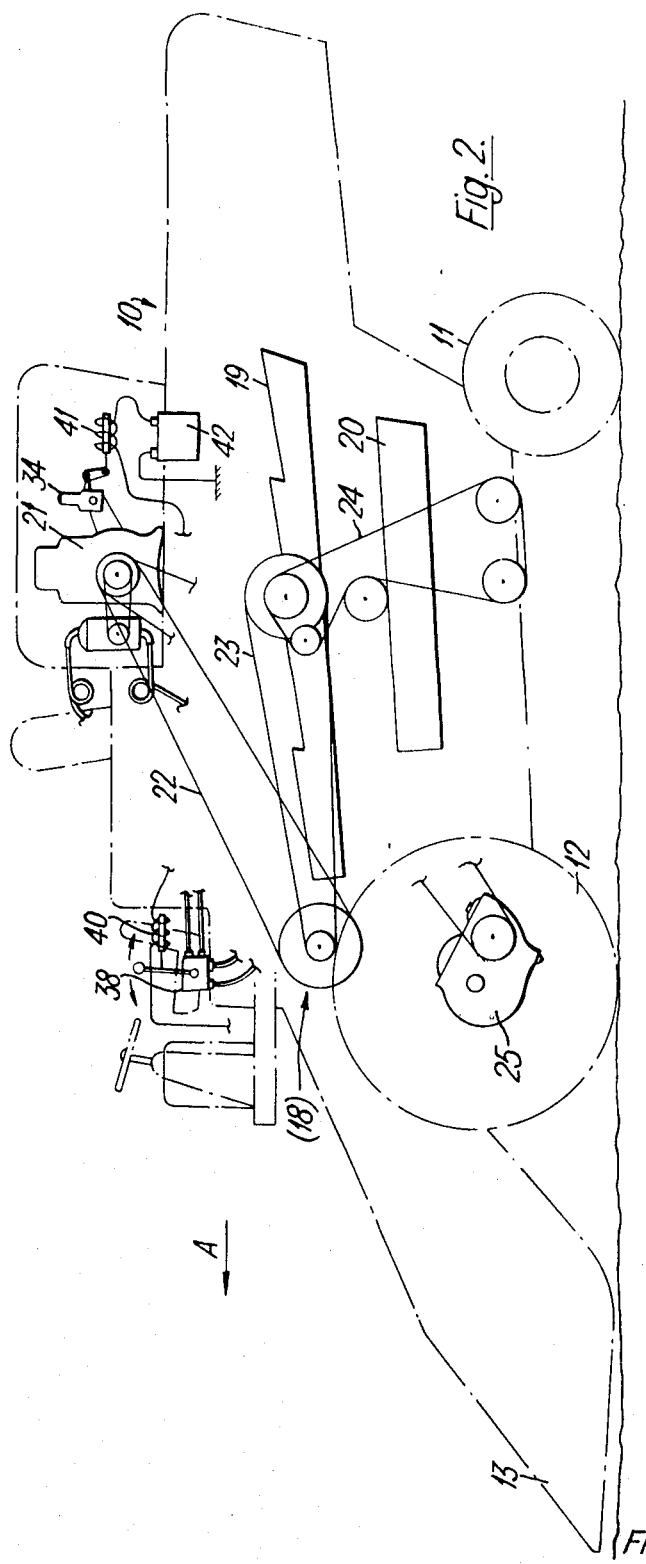

An embodiment of the present invention will now be described by way of example, with reference to the drawings in which:

FIG. 1 is a diagrammatic representation of parts of a combine harvester incorporating the present invention viewed from one side, and FIG. 2 is similar to FIG. 1 with some parts omitted and other parts included.

In the drawings, a mobile agricultural crop-collecting and crop-treating machine in the form of a combine harvester thresher is generally indicated at 10. The harvester is provided with ground wheels 11 and 12. The wheels 11 are steering wheels and the wheels 12 drive the harvester in the direction of arrow A in the drawings so that crop material may be collected by components carried by the harvester table 13. As shown in FIG. 1, the components of the harvester table include a crop-cutting knife 14, a table auger 15 and a table elevator assembly 16.

The harvester includes crop-treating parts in the form of a concave 17 and associated thresher cylinder 18, straw-walkers 19 and a shaker shoe assembly 20. The crop-treating assemblies are driven by an engine 21 and a fixed ratio transmission in the form of belt drives 22, 23 and 24 shown in FIG. 2.

The drive train for driving the ground wheels 12 includes a reduction gear box 25 and a variable-ratio transmission in the form of a variable V-belt drive 26 between the input to the gearbox 25 and the engine 21. The variable V-belt drive 26 incorporates variable diameter pulleys 27, 28 mounted concentrically on a swinging arm 29. Movement of the arm 29 about a pivot 30 effects a change in the transmission ratio one way or the other by changing the effective diameter of one of the pulleys relative to the other.

The table elevator assembly 16 is capable of swinging movement inside the elevator housing about the upper elevator shaft 31 and is thus sensitive to variations in the quantity of crop taken in during operation of the harvester. An excessive crop intake causes upward swinging movement of the elevator assembly 16 inside the elevator housing when the material passes under the elevator assembly. A sensor in the form of a pair of mutually cooperable electrical contacts 32 and 33 of which contact 32 is fixed and contact 33 is mounted on and can move with the elevator assembly 16 signals in response to variation in crop intake rate by making or breaking contact according to whether or not the intake of crop is excessive or satisfactory for given conditions.

Means for controlling the speed of operation of the crop-treating parts 18, 19 and 20 and the speed of the ground wheels 12 consists of a two-stage speed governor 34 on the engine 21, and a ratio adjuster in the form of a double-acting hydraulic ram 35 operatively connected between the swinging arm 29 associated with the variable V-belt drive 26 and a fixed point 36 on the harvester. The ram 35 is powered by a hydraulic pump 37 which is driven by the engine 21, and operation of the ram 35 is controlled by a manually operable control valve 38 in the line connection 39 between the pump 37 and the ram 35. In order to make the speed controlling means (the variable V-belt drive 26 and the governor 34) operate in response to a signal received from the electrical contacts 32, 33, solenoid actuators 40 and 41 are linked respectively to the control valve 38 and to the governor 34. The solenoids are electrically connected in series one with the other and with the contacts 32, 33. The electrical circuit is completed by a battery 42 with a ground cable and a ground connection 43 on the contact 33. The solenoid 40 is arranged to actuate the valve 38 so as to cause a reduction in ground wheel speed when the electrical circuit is energised, and the solenoid 41 is arranged to switch the speed governor 34 from a "normal maximum" setting to a higher setting, providing, for example, a 10% increase in engine speed. Both solenoids are preferably provided with means for adjusting their length of travel, and both are spring-loaded for return to "normal" when the electrical circuit is de-energised.

During "normal" operation of the harvester, the engine speed is governed at the aforesaid "normal maximum" and the ground-speed is adjusted by an operator using the manually operable valve 38 so as to obtain optimum crop-intake rate. Once a satisfactory setting for the ground speed has been established, an unexpected increase in crop intake rate causes the elevator assembly 16 to swing upwards and complete the electrical circuit whereupon the valve 38 is moved to decrease the ground speed and the governor 34 is switched to a higher engine speed setting. Thus, while the resulting increase in engine speed increases the speed of operation of the crop-treating parts 18, 19 and 20 to cope with the increased intake, the simultaneous ground-speed-reducing ratio-change in the drive 26 is sufficient either to reduce ground-speed and therefore crop-intake rate, or to maintain ground-speed substantially constant, depending upon the travel adjustment in the solenoid actuator 40. As soon as the crop-intake rate reverts to "normal" the electrical circuit is broken by the contacts 32, 33 which thus signal the solenoids to allow the valve 38 and the governor 34 to return to their initial settings.

The travel adjustment on the solenoid actuator 40 may be set so that the valve 38 is moved to rapidly reduce the ground speed upon energising of the electric circuit. In this case, it will be appreciated that a greater proportion of the power of the engine would become available for driving the crop-treating parts, especially the threshing cylinder 18. This extra power for driving the crop-treating parts could prevent the excessive crop-intake from overloading the engine and thereby upsetting the efficiency of the harvester temporarily.

It is to be understood that the valve 38 is controllable manually at all times, the soenoid 40 serving only to change the valve setting by a predetermined amount upon energising of the electric circuit:

I claim:

1. A mobile agricultural crop-collecting and crop-treating machine comprising a variable speed engine including a multiple stage governor, a crop-treating part, a first fixed ratio drive means to transmit power from the engine to the crop-collecting and crop-treating parts, a ground propulsion unit, a second drive including a variable ratio transmission to transmit power from the engine to the ground propulsion unit, a sensor for sensing the quantity of crop material entering the machine, and control means operative in response to a signal received from the sensor to switch the governor from one stage to another to increase the speed of the crop-collecting and treating parts when the sensor indicates an increase above a predetermined amount in the quantity of crop material or to decrease the speed of the crop-treating and collecting mechanism when the sensor indicates a decrease below a predetermined amount in the quantity of the crop material.

2. The mobile agricultural crop-collecting and crop-treating mechanism of claim 1 including a variable ratio control means responsive to a signal received from the sensor to vary the ratio of the variable ratio transmission to decrease the ground speed when the signal from the sensor indicates an increase above a predetermined amount in the quantity of crop material or to increase the ground speed of the machine when the signal from the sensor indicates a decrease below a predetermined amount in the quantity of crop material.

References Cited
UNITED STATES PATENTS

| | | | |
|---|---|---|---|
| 3,073,099 | 1/1963 | Andersen | 56—20 |
| 3,470,681 | 10/1969 | Saemann | 56—20 |

ANTONIO F. GUIDA, Primary Examiner

U.S. Cl. X.R.

56—Dig 15